Oct. 31, 1967     D. E. WHITEHEAD     3,350,551
MULTIPLE FLASH BULB HOLDER
Filed March 7, 1966     2 Sheets-Sheet 1

INVENTOR
David E. Whitehead
BY
Polachek & Saulsbury
ATTORNEYS

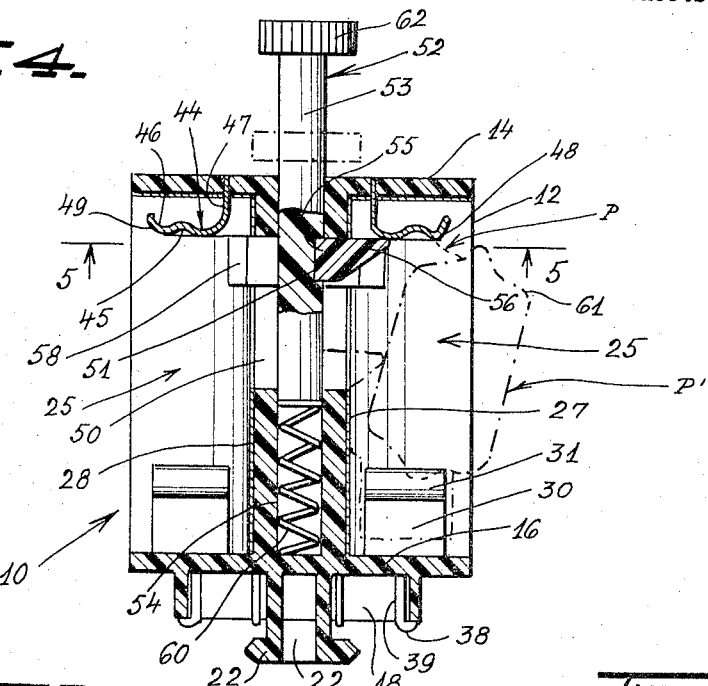
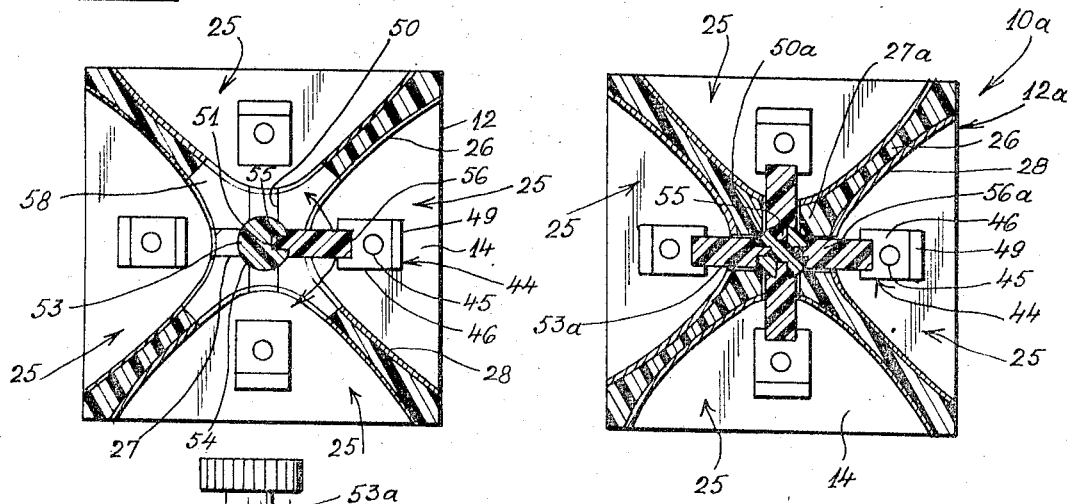
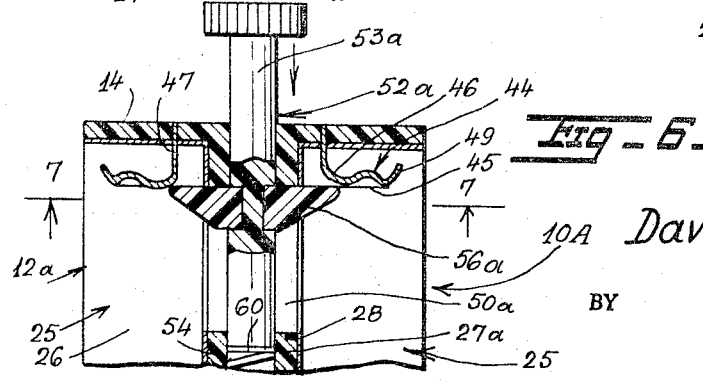

United States Patent Office 3,350,551
Patented Oct. 31, 1967

3,350,551
MULTIPLE FLASH BULB HOLDER
David E. Whitehead, Ardsley, N.Y. (% Cinek Films, Inc., 936 8th Ave., New York, N.Y. 10019)
Filed Mar. 7, 1966, Ser. No. 532,278
8 Claims. (Cl. 240—1.3)

This invention relates to a cubic reflector-holder arranged to support a plurality of conventional small flash bulbs of the type generally designated as AG-1, and more particularly concerns a cubic reflector-holder which mounts on a camera and is rotated automatically by a mechanism in the camera each time a flash bulb is fired.

Heretofore cubic flash bulb assemblies have been fabricated with four flash bulbs permanently wired onto a base. The assembly is discarded after the four bulbs have been fired. The present invention is intended to provide a holder for several removable flash bulbs. The holder mounts on a camera like a conventional cubic flash bulb assembly. The present holder is not discarded after the flash bulbs are fired. According to the invention, the fired flash bulbs can be selectively ejected and removed from the holder by manual operation of a pushbutton. Then fresh bulbs can be snapped in place in the holder. An important advantage of the present invention is that the user may install flash bulbs made by any manufacturer and is not limited to using flash bulbs supplied solely by a manufacturer of a cubic flash bulb assembly as heretofore. Another advantage is that differently rated bulbs, such as blue or white, can be employed instead of just one type specified and provided by the manufacturer of prewired cubic flash bulb assemblies. Still another advantage is a substantial saving in cost, since only fired bulbs need be replaced. The holder remains and is used over and over again.

It is therefore a principal object of the invention to provide a reflector-holder for multiple replaceable flash bulbs.

Another object is to provide a cubic type of reflector-holder multiple replaceable diminutive flash bulbs, in which the holder is provided with a pushbutton operated plunger adapted to eject fired bulbs from the holder.

A further object is to provide a reflector-holder as described, wherein the holder is adapted for rotatable mounting on a camera, the holder being rotatable to different positions, so that the bulbs can be fired in turn in a forwardly facing position of the holder.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 4 is vertical sectional view taken on line 4—4 of FIG. 3.

FIG. 5 is a horizontal sectional view taken on line 5—5 of FIG. 4.

FIG. 6 is a fragmentary sectional view similar to a part of FIG. 4 showing another form of the invention.

FIG. 7 is a cross sectional view taken on line 7—7 of FIG. 6.

Figure 1:
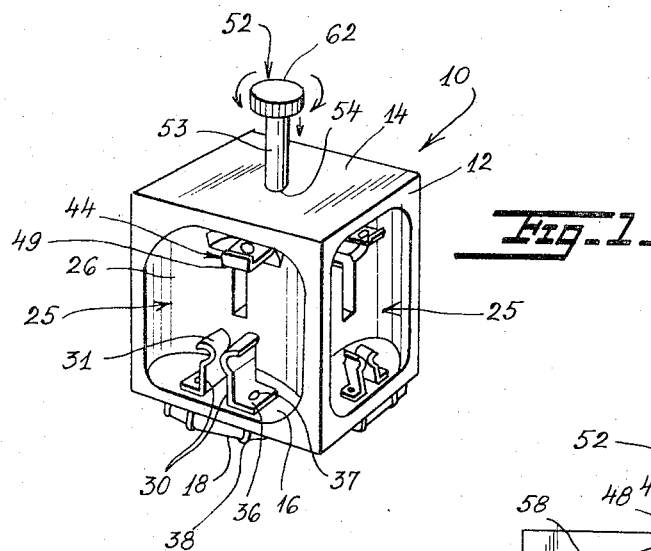
FIGURE 1 is a perspective view of a flash bulb holder embodying the invention.

Referring to the drawing, there is shown in FIGS. 1–5 a reflector-holder 10 which is made of rigid plastic material such as an acrylic, phenolic or the like. The reflector-holder has a polygonal body 12 which is substantially cubic in form with a top wall 14 and bottom wall 16. Integral with the bottom wall and extending axially downward therefrom is a cylindrical ring 18 which mounts on top of a camera C indicated by dotted lines in FIG. 2. A central post 20 extends axially downward from bottom wall 16. This post is provided with four radially extending teeth 22. The post and teeth engage in a rotatable mechanism 24 in the camera so that the entire reflector-holder can be rotated 90° each time the mechanism 24 is actuated. No further details of the mechanism 24 and camera C need be described since they are conventional and form no part of the present invention.

In body 12 are formed four chambers or compartments 25 each open at a different one of the four vertical sides of the body 12. Four diagonally extending partitions 26 radiating from central core 27 divide the body 12 into the four chambers. The vertical faces of partitions 26 are coated with a highly reflective metallic film 28.

The reflective coating is also applied to the underside of top wall 14 at the tops of the four chambers.

Figure 2:
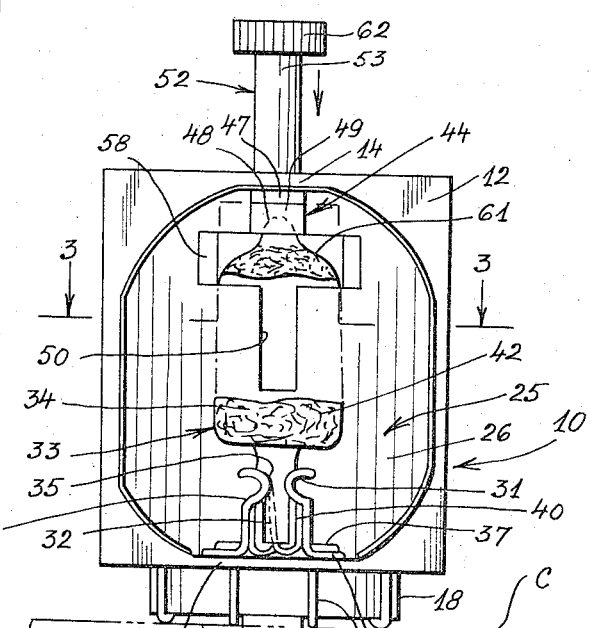
FIG. 2 is an enlarged elevational view of the flash bulb holder, with a flash bulb shown mounted therein, parts of the bulb being broken away.
Figure 3:
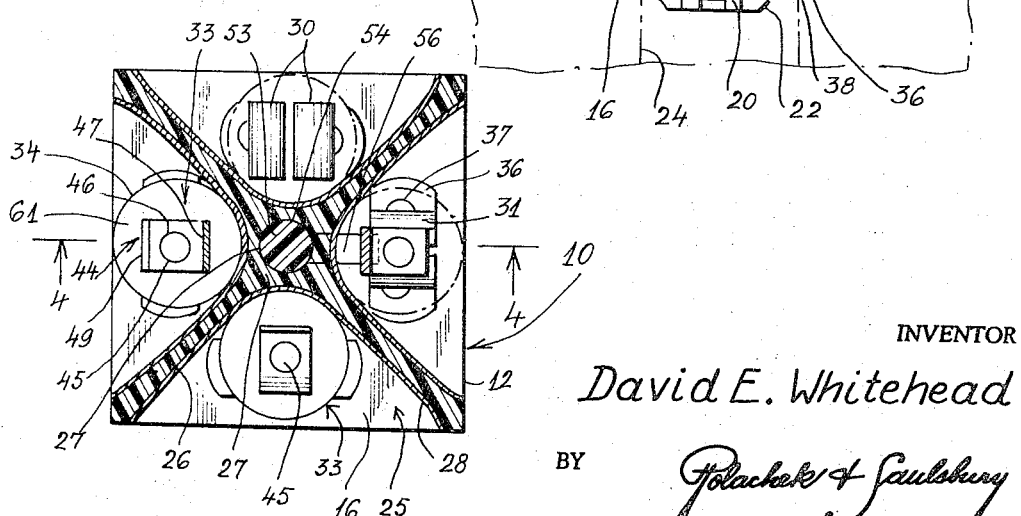
FIG. 3 is a horizontal sectional view taken on line 3—3 of FIG. 2, two bulbs being shown in the holder, certain parts being broken away.

On the flat bottom of each chamber is a pair of leaf springs 30 provided with upper bowed ends 31 turned in opposite directions to receive the rather flat broad base stem 32 of a small flash bulb 33 having a cylindrical envelope 34 as clearly shown in FIG. 2. The bulb stem is provided with notches 35 at opposite sides in which the bowed upper ends 31 of the springs engage. The flat bottom end 36 of each of the springs is turned laterally and is secured to the bottom of the chamber by the head 37 of a pin or rivet 38. This pin extends downwardly through a hole in the bottom of body 12 and then continues axially down along the outside of ring 18. The pin has a free end 39 turned up inside the ring; see FIG. 4. It will be noted that there are two spaced pins 38 provided as electrical conductors for each flash bulb. The pin heads 37 engage spring ends 36. Upper ends respectively of springs 30 engage turned up springy ends of terminal wires 40 which extend through the bulb stem 32 and terminate at spaced points in a mass of fine flash wire 42 inside the glass envelope 34. When the reflector-holder 10 is positioned on the camera C, the forwardly exposed and facing pair of pins 38 are contacted by a pair of electrical contacts (not shown) on the camera for passing an electric current through the flash bulb to ignite the wire 42.

Centrally disposed above springs 30 in each cavity is a generally L-shaped leaf spring 44 having a recess 45 in its lower leg 46. The vertical leg 47 of the spring is embedded in the top wall 14 of the body 12; see FIG. 4. The tip 48 at the top of the flash bulb engages in recess 45 The leg 46 has a turned up forward toe 49 to facilitate insertion of the flash bulb tip under the spring 44 to engage in recess 45.

When the bulb is inserted in chamber 25, the stem 32 is forced down between springs 30 to separate them while the bulb is pushed in to engage the tip 48 under spring 44. The rear or inner side wall portion of the bulb abuts the innermost side of the cavity at core 27. Core 27 is formed with four slots 50, one slot opening into each cavity.

In order to eject the flash bulbs 33 there is provided a manually operable pushbutton 52 having a shaft 53 movable axially through a bore 54. Secured in a recess 51 in shaft 53 is key 56 of a lug 55 which extends radially outward of the shaft through any one of slots 50. Lateral apertures 58 communicating with slots 50 are formed in core 27 and partitions 26 so that the shaft 53 can be rotated to turn the lug 56 which will move through the apertures 58. The shaft 53 can be turned to locate lug 56 in registration with any one of slots 50. When the lug is properly located its outer free end will touch the rear side of a spring 44 which serves as a detent device. Thus the shaft 53 can be turned to snap the lug into any one of four predetermined positions aligned with the four axially extending slots 50. The bottom end of shaft 53 is disposed in bore 54 and is supported by a coil spring 60 in this bore; see FIG. 4. The flat top of lug 56 abuts the upper rim end of slot 50 in core 27.

The lug 56 has an upwardly and outwardly slanted underside 59 which is slightly spaced from the shoulder 61 of the flash bulb envelope. Thus the lug can be turned around without displacing any bulb. However, if the head 62 at the upper end of shaft 53 is pressed down, the shaft and lug will be pushed down to the dotted line position shown in FIG. 4. The bulb shown axially upright by dotted lines at position P will be pushed out of engagement with spring 44 as shown by the axial inclined bulb at position P'. The bulb can then easily be picked up or shaken out of the body 12 to vacate the chamber 25 in which it was previously seated. Thereafter, the pushbutton can be released and the shaft and lug will move up to the position shown in solid lines in FIG. 4. Now the shaft can be turned in either direction to locate lug 56 in another chamber for dislodging the bulb therein. When the pushbutton is released the lug 56 is elevated out of the way so that a fresh bulb can be placed into the chamber.

In FIGS. 6 and 7 is shown another reflector-holder 10a which is generally similar to reflector-holder 10 and corresponding parts are identically numbered. The pushbutton 52a is not rotatable. This pushbutton has four lugs 56a extending radially of shaft 53a. The lugs move in slots 50a axially of the core 27a in cubic body 12a and serve to eject all four flash bulbs 33 simultaneously from the four chambers 25. The reflector-holder 10 shown in FIGS. 1–5 has the advantage that any one bulb can be removed and replaced from any chamber but it is necessary to rotate the shaft 53 position the lug 56 for bulb ejection. The reflector-holder 10a on the other hand ejects all bulbs 33 at once without requiring rotation of the pushbutton 52a.

Each of the reflector-holders has the same basic advantage of employing a permanent holder body which supports expendable flash bulbs and is not itself discarded when the flash bulbs are fired. The reflector-holders can be made up in larger sizes to accommodate larger flash bulbs. They also can be made up in cylindrical or other polygonal forms with more than four compartment chambers to hold a larger number of bulbs 33. In any case bulb ejection means will be provided as described and illustrated.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. A reflector-holder for flash bulbs having generally cylindrical envelopes with flat grooved stems, wire terminals at opposite sides of the stems and pointed tips at upper ends of the envelopes, said reflector-holder comprising a polygonal body having top and bottom walls, a central core extending between the top and bottom walls, partitions extending radially outwardly of said core between said walls and with said walls defining a plurality of chambers, spring means at the bottom of each chamber for removably receiving and engaging the stem of a flash bulb, said partitions having highly reflective surfaces facing outwardly of said body, means extending downwardly from said bottom wall for rotatably mounting said body on a camera, manually operable means carried by said body for ejecting flash bulbs seated in the chambers, said latter means comprising shaft extending axially of the core and outwardly of said top wall, said core having an axial bore receiving said shaft and having axially extending slots circumferentially spaced around the core and communicating between said bore and the respective chambers, a coil spring in said bore normally holding the shaft in an inoperative position, and a lug operable by said shaft and extending radially thereof outwardly of any one slot into one chamber for displacing a flash bulb from said one chamber when the shaft and lug are operated in said body.

2. A reflector-holder as recited in claim 1, wherein said core and partitions have apertures extending laterally of the slots coplanar with said lug in its uppermost position so that the shaft and lug can be rotated to position the lug in any one of the chambers for ejecting the flash bulb therein.

3. A reflector-holder as recited in claim 2, and a leaf spring in each chamber near the top wall thereof and centrally located for removably engaging the tip of a flash bulb and exerting a longitudinal pressure thereon and coacting with the bottom spring means for holding the bulb against displacement from the chamber, said lug having an outer free end contacting the leaf spring in each chamber when the lug is properly centered in alignment with the slot opening into the chamber, whereby the leaf springs serve as detent means to indicate proper positioning of the lug in each chamber in turn.

4. A reflector-holder for flash bulbs having generally cylindrical envelopes with flat grooved stems, wire terminals at opposite sides of the stems, and pointed tips at upper ends of the envelopes, said reflector-holder comprising a polygonal body having top and bottom walls, a central core extending between the top and bottom walls, partitions extending radially outwardly of said core between said walls and with said walls defining a plurality of chambers, spring means at the bottom of each chamber for removably receiving and engaging the stem of a flash bulb, said partitions having highly reflective surfaces facing outwardly of said body, means extending downwardly from said bottom wall for rotatably mounting said body on a camera, a leaf spring in each chamber near the top wall thereof, and centrally located for removably engaging the tip of a flash bulb and exerting a longitudinal pressure thereon and coacting with the bottom spring means for holding the bulb against displacement from the chamber, manually operable means carried by said body for ejecting flash bulbs seated in the chambers, said latter means comprising a shaft extending axially of said core and outwardly of said top wall, said core having an axial bore receiving said shaft and having axially extending slots circumferentially spaced around the core and communicating between said bore and the chambers respectively, a coil spring in the bore normally holding the shaft in an elevated position, and a plurality of lugs carried by said shaft and extending radially thereof in circumferentially spaced positions, said lugs extending outwardly through said clots respectively into the respective chambers, whereby all of the flash bulbs seated in the chambers will be simultaneously displaced by said lugs when the shaft is lowered in said core.

5. A reflector-holder for flash bulbs having generally cylindrical envelopes with flat grooved stems, wire terminals at opposite sides of the stems and pointed tips at upper ends of the envelopes, said reflector-holder comprising a polygonal body having top and bottom walls, a central core extending between the top and bottom walls, partitions extending radially outwardly of said core between said walls and with said walls defining a plurality of chambers, spring means at the bottom of each chamber for removably receiving and engaging the stem of a flash bulb, said partitions having highly reflective surfaces facing outwardly of said body, means extending downwardly from said bottom wall for rotatably mounting said body on a camera, a leaf spring in each chamber near the top wall thereof and centrally located for removably engaging the tip of a flash bulb, and exerting a longitudinal pressure thereon and coacting with the bottom spring means for holding the bulb against displacement from the chamber, manually operable means carried by said body for ejecting flash bulbs seated in the chambers, said spring means in each chamber comprising a pair of generally L-shaped closely spaced springs having flat bottom ends abutting the bottom wall of the chamber and having curved upper ends engaging in grooves, respectively, in the stem of the flash bulb and respectively engaging the wire terminals of the flash bulb, pairs of electrical conductors extending through said bottom wall, each pair of conductors respectively engaging the bottom ends of said closely spaced springs and having portions exposed at the bottom of said body for engaging electrical contacts on a camera, the means for ejecting the flash bulbs from the chambers comprising a shaft extending axially of said core and outwardly of said top wall, said core having an axial bore receiving said shaft and having axially extending slots circumferentially spaced around the core and communicating between said bore and the respective chambers, a coil spring in said bore normally holding the shaft in an elevated position, and a lug carried by said shaft and extending radially thereof outwardly of any one slot into one chamber for displacing a flash bulb from said one chamber when the shaft and lug are depressed in said body.

6. A reflector-holder as recited in claim 5, wherein said core and partition have apertures extending laterally of the slots coplanar with said lug in its uppermost position so that the shaft and lug can be rotated to position the lug in any one of the chambers for ejecting the flash bulb therein.

7. A reflector-holder as recited in claim 6, wherein the lug has an outer free end contacting the leaf spring in each chamber when the lug is properly centered in alignment with the slot opening into the chamber, whereby the leaf springs serve as detent means to indicate proper positioning of the lug in each chamber in turn.

8. A reflector-holder as recited in claim 5, wherein the means for ejecting the flash bulbs from the chambers comprises a shaft extending axially of said core and outwardly of said top wall, said core having an axial bore receiving said shaft and having axially extending slots circumferentially spaced around the core and communicating between said bore and the chambers respectively, a coil spring in the bore normally holding the shaft in an elevated position, and a plurality of lugs carried by said shaft and extending radially thereof, in circumferentially spaced positions said lugs extending outwardly through said slots respectively into the respective chambers, whereby all the flash bulbs seated in the chambers will be simultaneously displaced by said lugs when the shaft is lowered in said core.

References Cited

UNITED STATES PATENTS

| | | | |
|---|---|---|---|
| 2,745,945 | 5/1956 | Blount | 240—1.3 |
| 3,071,681 | 1/1963 | Schmidt | 240—1.3 |
| 3,096,025 | 7/1963 | Prochnow | 240—1.3 |
| 3,196,770 | 7/1965 | Lange | 95—11 |
| 3,244,087 | 4/1966 | Anderson | 95—11 |

FOREIGN PATENTS 833,676  4/1960  Great Britain.

JOHN M. HORAN, *Primary Examiner.*